Sept. 25, 1962 G. L. OLSON 3,055,195
FABRICATED FLEXIBLE COUPLING
Filed March 28, 1961 2 Sheets-Sheet 2
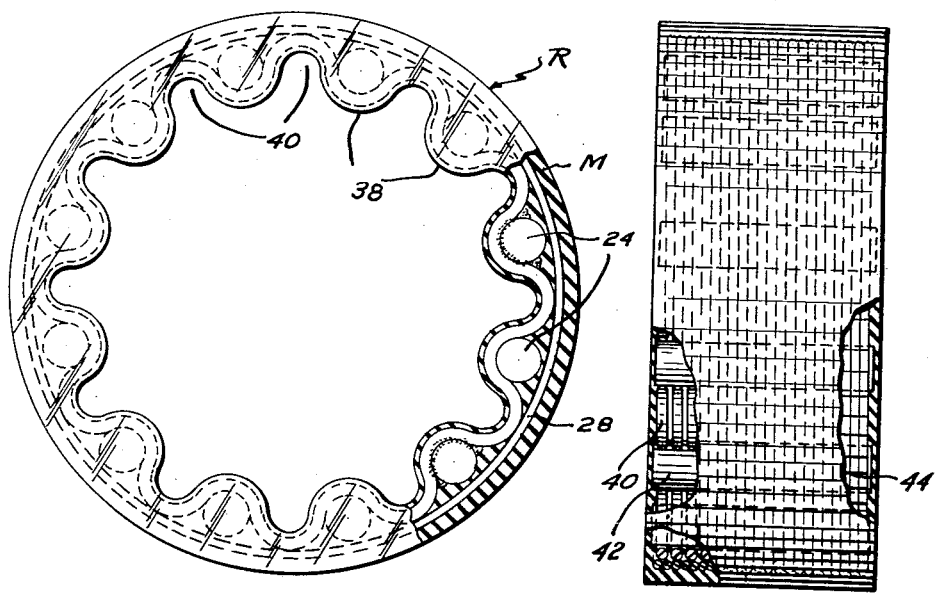
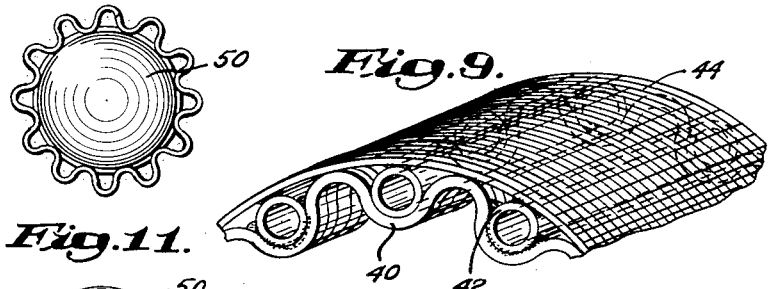
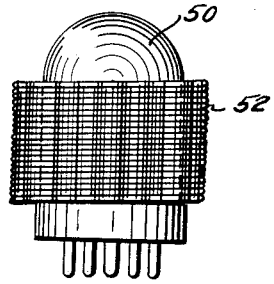
Inventor:
Gordon L. Olson,
by Munn & Hamilton
Attorney

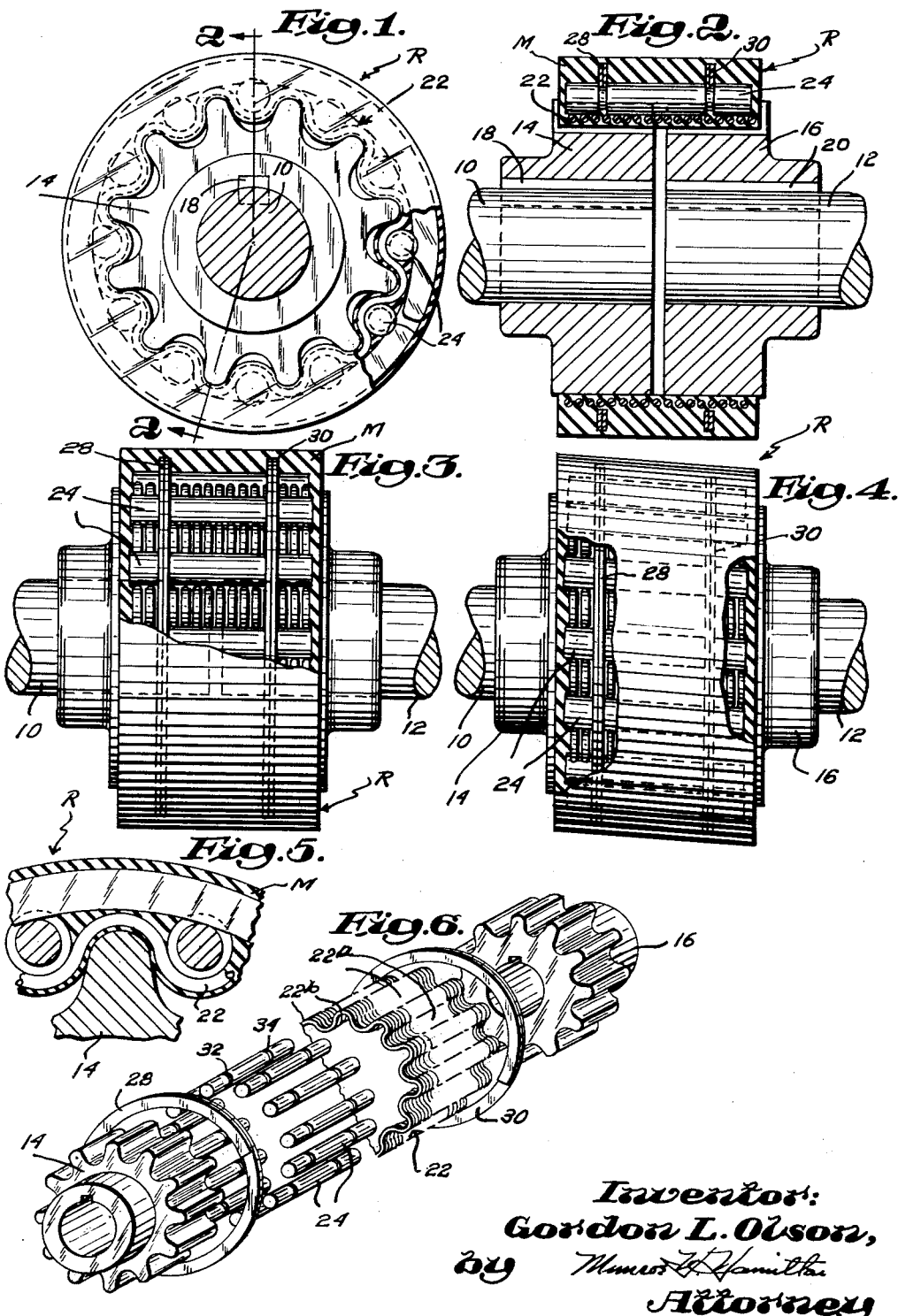

United States Patent Office 3,055,195
Patented Sept. 25, 1962

3,055,195
FABRICATED FLEXIBLE COUPLING
Gordon L. Olsen, 85 Columbia Road, Arlington, Mass.
Filed Mar. 28, 1961, Ser. No. 98,845
8 Claims. (Cl. 64—11)

This invention relates to devices for receiving and transmitting torque forces. Reference is had especially to torque devices of the general class employed in power transmission, torque arresting members, shock absorbing means, and the like. In one preferred form the invention is concerned with a flexible coupling structure for connecting two shaft extremities in satisfactory driving relationship to one another particularly when the shafts occur in angular or parallel misalignment.

It is a chief object of the invention to improve torsion devices and couplings of the character indicated and to devise a torque transmission member by means of which the rotary driving forces of a rotating member may be more effectively transmitted to another rotating member in varying positions of misalignment. Another object of the invention is to provide a connecting device in which the resiliency of a fabricated metal member is combined with the elasticity of a moulded composition protectively arranged to provide a very high degree of torque resistance with efficient power transmission and shock absorption.

In the course of realizing these objectives I have conceived of a novel torsion device for receiving and transmitting torque forces in a manner such that various new advantages and efficiencies may be realized. In constructing my improved torsion member, I start with a resilient wire of spring steel or other desired material, and I arrange the wire in a plurality of closely ocmpacted helical turns to provide a coil. I also form each helical turn with a corrugated or wave shape so that the periphery of the coil body presents a series of parallel grooves and ridges. There is thus built into each helical turn a multiplicity of tiny V's which operate to greatly increase the ability of the turns to flex and resist torsional or twisting forces exerted on one end of the coil when the other end is held in a fixed position.

This corrugated coil member is further combined with a body of elastic material so that the helical turns of the coil are either partly or entirely embedded in protectively contained relationship whereby their flexibility characteristics are limited in a controlled manner. Thus there is realized a torsion ring structure which is characterized by unusual ability to resist and absorb torque forces of considerable intensity.

In a preferred form of my torsion device, I further combine special torque control means which cooperate with the corrugated coil to reinforce this member as well as to regulate and control resistance to torsional deflection. The torque control means includes a plurality of torque control rods which are arranged in nested relationship in the grooves of the corrugated coil, together with outer retaining ring means which are engaged around the torque control rods. These parts, as well as the coil, are all contained within the body of elastic material to provide novel flexibility characteristics as noted below.

The nature of the invention and its other objects and novel features will be more fully understood and appreciated from the following description of a preferred embodiment of the invention selected for purposes of illustration and shown in the accompanying drawings, in which:

FIG. 1 is a side elevational view of the coupling construction of the invention;

FIG. 2 is a cross section taken approximately on the line 2—2 of FIG. 1;

FIG. 3 is another elevational view shown partly in cross section and illustrating the coupling member of the invention associated with two shaft members;

FIG. 4 is another view in elevation similar to FIG. 3, but showing shaft members in angular misalignment;

FIG. 5 is a fragmentary cross sectional view of a portion of a gear tooth and adjacent coupling sections engaged thereby;

FIG. 6 is an exploded view illustrating the various coupling components separated from one another and particularly illustrating the helically wound wire sections of the coupling;

FIG. 7 is a side elevational view of a modified form of coupling;

FIG. 8 is an elevational view of the coupling shown in FIG. 7 partly broken away to more fully indicate the outer portion of the structure;

FIG. 9 is a fragmentary perspective view also showing details of construction of the coupling shown in FIGS. 7 and 8; and FIGS. 10 and 11 are views illustrating still another form of the invention.

Considering in greater detail the structure shown in the drawings, FIGS. 1–6 inclusive are illustrative of the torsion device of the invention employed as a flexible coupling for connecting two shaft members in driving relationship. As indicated in FIGS. 1 and 2, numeral 10 denotes a driven shaft and numeral 12 refers to a drive shaft powered in some conventional manner.

In accordance with the invention, I connect the two shaft members 10 and 12 by means of the torsion device of the invention as illustrated in FIG. 2. The torsion device includes a torsion ring generally denoted by arrow R and two coupling components 14 and 16 which engage in the torsion ring and which, as shown in FIG. 2, are adapted to be fitted over the ends of the shafts 10 and 12 respectively. The coupling components are preferably provided with key ways for receiving locking keys 18 and 20. Other well-known types of locking means may be used.

The torsion ring R constittues an important part of the flexible coupling structure and is made up of several different members of which a basic component is a specially formed coil 22, better shown in FIG. 6. Essentially, the coil consists of a length of material such as steel wire which is formed into a plurality of helical turns. In addition, each of the helical turns are corrugated in the manner shown in FIG. 6 to provide substantially parallel grooves 22a and ridges 22b. These corrugated portions are conveniently formed, for example, by means of a gear tooth shaped forming machine.

The grooves 22a, in the preferred form of the invention presently being considered, are employed to receive in nested relationship therein a plurality of torque control rods as 24 which are preferably made of steel or other desired material. The rods are constructed of a diameter such that they may nest in the grooves 22b and are of a length roughly corresponding to the axial length of the coil 22 as will be apparent from an inspection of FIGS. 3, 4 and 6. It is pointed out that the rods function to maintain each row of corrugation substantially parallel to an adjacent row, although still permitting the row to distort somewhat and to move into an angular position with respect to the central axis of the coil 22.

Each of the rods is preferably secured to one or more turns of the coil by some suitable means as welding in such a manner that the rods constitute an integral part of the coil and yet each turn of the coil may nevertheless be torsionally deflected and otherwise flexed in varying directions to absorb and resist torsion forces.

The torsion control rods are preferably confined within a plurality of retaining rings as 28 and 30 which are slidably engaged in slots 32 and 34. The slots are formed in each of the torsion control rods and are of a width substantially greater than the thickness of the retaining rings 28 and 30 so that these ring members may move relative to the rods and provide for limited distortion as well as axial displacement of the shafts 10 and 12.

I find that by varying the diameter of the torsion rods I may regulate the extent to which the rods engage within the respective grooves and in this way I am enabled to vary and modify the flexing characteristics of the coil. The rods also function when engaged in the grooves to distribute a torsion force applied on one end of the coil throughout all of the turns in the coil in a desirable manner to absorb shock and yet transmit rotary driving forces with any desired degree of deflection, both at the start of a driving operation and during the period when the coupling device is constantly rotating.

The coil 22, control rods 24, and retaining rings 28 and 30, comprise a unique torque responsive unit of limited flexibility and this entire unit is in accordance with the invention completely received within a body of elastic material M. The material M may consist of urethane or other rubberlike material, and is applied by special moulding apparatus.

This moulding apparatus may, for example, consist of a gear shaped mould part over which the corrugated coil is supported in slightly spaced relation. A second cylindrical mould part may be utilized to surround the outer periphery of the torsion unit. The moulding compound, such as urethane, is thereafter forced between the mould members, under heat and pressure, to produce the torsion ring structure shown in FIG. 7. When formed in this manner the torsion ring structure, with the gear shaped mould part removed, presents at its inner periphery a series of radially inwardly extending teeth as 38 and intervening grooves 40, as shown in FIG. 7. Into these grooves 40 may be engaged correspondingly gear shaped coupling components 14 and 16 which are more clearly shown in FIG. 6.

It will be observed that the torsion device thus comprises a most unique power transmitting member in which a very wide range of operating characteristics may be realized by varying one or more of the components. At the same time there is present a controlled degree of flexibility which permits the coupling of misaligned shafts as suggested in FIG. 4 with a minimum of wear and substantial elimination of shock and vibration. Where it is desirable to provide for a definite predetermined starting deflection from application of power driving means to a work rod it is, I find, possible to control the torque forces by control rods so as to obtain a very precise degree of deflection. At the same time it is readily possible to provide necessary strength characteristics to withstand any specific range of operating loads which may be required.

In utilizing the tension device as a power transmitting member, I may also desire to form the torsion ring in other ways in order to receive a rotary driving force. For example, I may form the outer peripheral portion of the torsion ring with gear teeth portions to be engaged by an internal ring gear driver, or I may provide engaging means such as pins connected to the ends of the torsion control rods, or I may use a magnet device and various other arrangements.

Likewise, it may be desirable to construct a torsion ring in the manner illustrated in FIGS. 8 and 9 in which the coil 40 is provided with torque control elements of a tubular form as illustrated by the tubular elements 42. These members are retained by an outer helical winding 44 located around the tubular elements 42. This arrangement imparts even greater resistance to load forces, as well as providing for increased rigidity where this may be desirable in a coupling member.

I may still further desire to employ the torsion ring device for various other purposes. For example, I may construct the outer periphery of the torsion ring with gear teeth and its inner periphery shaped to engage over a driving or driven shaft so that the device can be utilized in effect as a gear for transmitting rotary driving forces. Similarly, I may utilize the torsion device with either internal or external teeth as a shock absorbing member or torque arrestor where very heavy shock loads are generated in a short interval of time.

In still another instance I may utilize the device as a heat radiating member as suggested in FIGS. 10 and 11 in which numeral 50 denotes a heating tube and 52 indicates the torsion ring structure engaged therearound. I have found that because of the corrugated formation of the coil in an elastic body as described there are excellent heat radiating characteristics developed.

From the foregoing description it will be apparent that I have devised a unique and highly efficient coupling device which absorbs both parallel and angular misalignment stresses, as well as "end-float" or axial displacement. The coupling of the invention can correct to a greater degree because of its fabricated construction and it can also make this extended correction without wearing to an extent such as necessarily occurs with metal gear sleeve couplings. Another important feature is that in using the urethane protective body weight is cut down and since the urethane portion is farthest from the axis of rotation, a lower moment of inertia is realized which tends to increase bearing life. The device is free from lubrication requirements, is extremely easy to assemble and use and because of the mechanical properties of a substance such as urethane, is highly resistant to temperature changes, abrasion wear, storage problems and various other factors.

While I have shown and described preferred embodiments of the invention, it is intended that various other changes and modifications may be practiced within the scope of the appended claims.

I claim:

1. A coupling device of the class described, including a length of resilient material formed into a plurality of helical turns and an annular covering body of elastic material having the helical turns internally received therein to yieldably support the helical turns for limited torsional displacement, said helical turns being corrugated to provide parallel ridges and grooves.

2. A torsion device comprising a resilient coil corrugated to provide parallel ridges and grooves, a plurality of torque control rods received in the said grooves around the periphery of the coil and an elastic covering overlying the coil and torque control rods to form a torsion ring whose inner periphery presents gear tooth portions.

3. A structure according to claim 2 including coupling components having gear tooth portions engaged in driving relationship within the gear tooth portions of the torsion ring.

4. A structure according to claim 3 in which the elastic covering has embedded therein a plurality of spaced-apart retainer rings which extend around the torque control rods.

5. A torque absorbing connector device comprising a flexible annular connector body, coupling elements mounted at two opposite ends of the connector body, said connector body including a resilient coil embedded therein and presenting corrugated portions, torque control elements mounted around the corrugated portions of said coil, and a plurality of retainer rings adjustably engaged about the said control elements.

6. A structure as defined in claim 5 in which the annular connector body and corrugated coil are constructed and arranged upon one another to provide gear tooth portions for engaging the said coupling elements in driving relationship.

7. A structure according to claim 6 in which the gear tooth portions occur around the inner periphery of the annular connector body.

8. A structure according to claim 7 in which the coupling elements are formed with key means for engagement with a driver and driven member.

References Cited in the file of this patent
UNITED STATES PATENTS

| | | |
|---|---|---|
| 2,189,049 | Ungar | Feb. 6, 1940 |
| 2,536,216 | Powell | Jan. 2, 1951 |
| 2,737,033 | Bendall | Mar. 6, 1956 |
| 2,859,599 | Case | Nov. 11, 1958 |

FOREIGN PATENTS

| | | |
|---|---|---|
| 373,064 | Great Britain | May 19, 1932 |